United States Patent
Kairali et al.

(10) Patent No.: US 11,968,231 B2
(45) Date of Patent: Apr. 23, 2024

(54) INTELLIGENT REQUEST ROUTING WITHIN SERVICE MESH

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 17/393,504

(22) Filed: Aug. 4, 2021

(65) Prior Publication Data

US 2023/0039426 A1 Feb. 9, 2023

(51) Int. Cl.
*H04L 9/40* (2022.01)
*H04L 45/302* (2022.01)
*H04L 67/50* (2022.01)

(52) U.S. Cl.
CPC ............ *H04L 63/18* (2013.01); *H04L 45/306* (2013.01); *H04L 63/0263* (2013.01); *H04L 63/102* (2013.01); *H04L 63/1408* (2013.01); *H04L 67/535* (2022.05)

(58) Field of Classification Search
CPC . H04L 45/306; H04L 63/0263; H04L 63/102; H04L 63/1408; H04L 63/1425; H04L 63/18; H04L 67/306; H04L 67/535
See application file for complete search history.

(56) References Cited

U.S. PATENT DOCUMENTS

| 10,275,329 | B2   | 4/2019  | Chen |
| 10,425,437 | B1 * | 9/2019  | Bog ................... H04L 63/1408 |
| 10,447,770 | B2 * | 10/2019 | Pacella ................. H04L 9/3239 |
| 10,503,529 | B2 * | 12/2019 | Lopushenko ........... H04L 67/55 |
| 10,645,153 | B2 * | 5/2020  | Hassan .................... H04L 67/34 |
| 10,673,708 | B2 * | 6/2020  | Parthasarathy ..... G06F 11/3409 |
| 10,764,244 | B1 * | 9/2020  | Mestery .................. H04L 67/10 |
| 10,769,274 | B2 * | 9/2020  | Hassan ................... H04L 41/08 |
| 10,983,769 | B2 * | 4/2021  | White ................... G06F 9/5038 |
| 11,057,393 | B2 * | 7/2021  | Coffing ................. G06Q 20/40 |
| 11,134,093 | B1 * | 9/2021  | Bog ..................... H04L 63/1425 |
| 11,347,578 | B2 * | 5/2022  | Agarwal ............. G06F 11/0772 |

(Continued)

FOREIGN PATENT DOCUMENTS

WO 2016098968 A1 6/2016

OTHER PUBLICATIONS

Anonymous. "Request Routing." Printed Jul. 20, 2021. 6 pages. Published by Istio. https://istio.io/latest/docs/tasks/traffic-management/request-routing/#route-based-on-user-identity.

(Continued)

*Primary Examiner* — Sharon S Lynch (74) *Attorney, Agent, or Firm* — Michael A. Petrocelli (57) ABSTRACT

A processor may identify one or more predicted microservice chains for each of one or more user profiles. The one or more predicted microservice chains may be selected based on historical information. The one or more user profiles may each be associated with a respective user of a user device. The processor may analyze user specific information. The user specific information may be associated with the user device. The processor may determine, based on the user specific information, if the user device causes network intrusion. The processor may perform, based on the determination, an action for the user device.

14 Claims, 5 Drawing Sheets

(56) References Cited

U.S. PATENT DOCUMENTS

| | | | |
|---|---|---|---|
| 11,537,492 B1* | 12/2022 | Agarwal | G06N 5/045 |
| 11,637,849 B1* | 4/2023 | Chen | H04L 63/10 |
| | | | 726/22 |
| 11,677,772 B1* | 6/2023 | Kapoor | H04L 63/1408 |
| | | | 709/224 |
| 11,689,553 B1* | 6/2023 | Singh | G06F 9/455 |
| | | | 726/23 |
| 11,762,728 B1* | 9/2023 | Agarwal | G06F 11/0772 |
| | | | 714/37 |
| 11,770,464 B1* | 9/2023 | Sachdeva | H04L 41/142 |
| | | | 709/224 |
| 2003/0144894 A1* | 7/2003 | Robertson | G06Q 20/04 |
| | | | 709/226 |
| 2017/0223058 A1 | 8/2017 | Barabash | |
| 2018/0146070 A1* | 5/2018 | Lopushenko | H04L 67/306 |
| 2018/0352033 A1* | 12/2018 | Pacella | H04L 9/3239 |
| 2019/0057015 A1* | 2/2019 | Hassan | G06F 11/008 |
| 2019/0057213 A1* | 2/2019 | Hassan | H04L 67/1031 |
| 2019/0058761 A1* | 2/2019 | Hassan | H04L 67/1012 |
| 2019/0163559 A1 | 5/2019 | Takahashi | |
| 2019/0273746 A1* | 9/2019 | Coffing | G06Q 20/40 |
| 2020/0050494 A1* | 2/2020 | Bartfai-Walcott | G06F 9/5083 |
| 2020/0120000 A1* | 4/2020 | Parthasarathy | H04L 67/10 |
| 2020/0267057 A1* | 8/2020 | Garvey | H04L 41/0816 |
| 2020/0358802 A1* | 11/2020 | Viswambharan | G06F 9/5072 |
| 2020/0364035 A1* | 11/2020 | White | G06F 9/547 |
| 2021/0037051 A1 | 2/2021 | Williamson | |
| 2021/0084068 A1 | 3/2021 | Teng | |
| 2021/0117242 A1* | 4/2021 | Van De Groenendaal | |
| | | | H04L 67/1001 |
| 2021/0191706 A1* | 6/2021 | Sn | G06F 11/3466 |
| 2021/0216391 A1* | 7/2021 | Agarwal | G06F 11/0772 |
| 2021/0226988 A1* | 7/2021 | Aviv | H04L 63/20 |
| 2022/0172067 A1* | 6/2022 | Kang | G06N 3/088 |
| 2022/0197306 A1* | 6/2022 | Cella | G05D 1/0221 |

OTHER PUBLICATIONS

Balajinath, et al., "Intrusion detection through learning behavior model." Published Jul. 2001. 15 pages. Published by Research Gate. Abstract Only. https://www.researchgate.net/publication/223771520_Intrusion_detection_through_learning_behavior_model.

Beigi, et al., "CAAMP: Completely automated DDoS attack mitigation platform in hybrid clouds." Published Oct. 2016. 9 pages. Published by Research Gate. https://www.researchgate.net/publication/311509655_CAAMP_Completely_automated_DDoS_attack_mitigation_platform_in_hybrid_clouds.

Chen, et al., "Dispersing Asymmetric DDOS Attacks with SplitStack." HotNets-XV, Nov. 9-10, 2016, Atlanta, GA, USA. 8 pages. Published by ACM. DOI: http://dx.doi.org/10.1145/3005745.3005773.

Demoulin, et al., "Automated Detection and Mitigation of Application-level Asymmetric DoS Attacks." SelfDN 2018, Aug. 24, 2018, Budapest, Hungary. 7 pages. Published by ACM. https://doi.org/10.1145/3229584.3229589.

Malek, et al., "User Behaviour based Intrusion Detection System Overview." Published Oct. 2018. 11 pages. In International Journal for Research in Applied Science & Engineering Technology (IJRASET) vol. 6 Issue X. Published by Research Gate. https://www.researchgate.net/publication/343166387_User_Behaviour_based_Intrusion_Detection_System_Overview.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

INTELLIGENT REQUEST ROUTING WITHIN SERVICE MESH

BACKGROUND

The present disclosure relates generally to the field of request routing, and more specifically to intelligent request routing to address network intrusion within service mesh.

In service mesh-based architecture there is a request routing concept that allows dynamic routing to different versions of a same application based on user identity. In every system there may be activities by prohibited users, especially if the system is publicly accessible. Most of the users of service mesh architecture may be allowed, however, a prohibited user may impact user experience and security of the allowed users by network intrusion, denial-of-service attacks, etc.

SUMMARY

Embodiments of the present disclosure include a method, computer program product, and system for intelligent request routing to address network intrusion within service mesh. A processor may identify one or more predicted microservice chains for each of one or more user profiles. The one or more predicted microservice chains may be selected based on historical information. The one or more user profiles may each be associated with a respective user of a user device. The processor may analyze user specific information. The user specific information may be associated with the user device. The processor may determine, based on the user specific information, if the user device causes network intrusion. The processor may perform, based on the determination, an action for the user device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of request routing, and more specifically to intelligent request routing to address network intrusion within service mesh. While the present disclosure is not necessarily limited to such applications, various aspects of the disclosure may be appreciated through a discussion of various examples using this context.

In service mesh-based architecture there is a request routing concept that allows dynamic routing to different versions of a same application based on user identity. Further mesh is a network topology in which devices are connected with many redundant interconnections between network nodes/devices. In every system there may be activities by prohibited (e.g., unauthorized, illegitimate, etc.) users, especially if the system is publicly accessible. Most of the users/clients of service mesh architecture may be allowed (e.g., authorized, legitimate, etc.), however, a prohibited user may impact user experience and security of the allowed users by network intrusion, denial-of-service attacks (DO Sing), etc.

Currently, a user will have to deploy Network Intrusion Detection and Prevention Systems (NIDPS) to prevent network intrusion. However, NIDPS is resource intensive, and it may slow down traffic for allowed users as well. Further, with NIDPS, it may need to be put in an entry point while the microservices that require this protection may be in the middle of a (microservice) chain; thus, the system may be slowing down activities of microservices that are in front of the targeted (prevention intrusion) microservice unnecessarily.

Lastly, for example, if a user is receiving multiple 40X (e.g., 4XX http status code errors, client errors, etc.) errors at microservice 4 (M4) and M1, M2, and M3, etc. are talking to/in communication with M4, the user is still able to reach up to M4 through M1, M2, and M3, and utilize resources that might be resulting in a failed transaction.

Accordingly, there is a need for a solution, which is discussed herein, by which a possible (e.g., predicted, predictive) chain of microservices for a particular user profile is identified and it is determined whether any microservice is reporting network intrusion for such a user, and if yes, route requests from such users are routed to a new compartmentalized (e.g., secured) chain that will only cater such users that has prior network intrusion history. Similarly, when a particular user is resulting in multiple of 40X errors, the proposed solution automatically moves the particular user (or device associated with the user) to the more secure compartment and automatically applies rate limits in the beginning of the chain itself.

Before turning to the FIGS., the novelties of the disclosed solution are highlighted below. In embodiments, based on historical information/learning, the proposed solution may be able to identify/predict possible microservice chains for each user profile. In some embodiments, based on historical learning/analyzing of user specific information, the solution may identify the users whose activities result in network intrusion detection within a service mesh. the proposed solution may also detect users/user devices that have caused 40X errors above a threshold period (e.g., too many errors with a particular/specific time period, errors based a baseline error threshold, etc.).

In some embodiments, the proposed solution may automatically generate temporary secured (microservice) chains for such user profiles/user devices and route requests of such users/user profiles/user devices to the temporary secured chain. In such embodiments, secured chains will have NIDPS protect at the beginning of the chain and for each microservice involved. Additionally, the secured chain may apply rate limits to users/user devices that resulted in a large amount of 40X activities.

In some embodiments, the newly generated secured chain may be considered a new version of the microservices for each of the microservices participating, and request routing rules may make sure that the specific users are routed to the new secured chain. As an example, if, in a microservice chain of M1, M2, and M3, and M3 is where a network intrusion is detected, the intrusion prevention will be applied at the entry point, which is M1; this may be called a fast-forwarded intrusion prevention of a microservice chain. It is noted that since there is a new microservice chain (although just a replica of old microservices because it is predicted), that system administrators may be able to isolate resource and scaling requirements for such chains and hence monopolization of resources of the chains, or the chains of microservices themselves, by unauthorized users may be limited.

In some embodiments, if the users/user devices that are being secured on the new chain are not creating further issues (e.g., network intrusion, DOSing, etc.), such users may be moved back to an original chain by dynamically/ automatically changing/updating/augmenting request routing. In some embodiments, if a secured chain does not have at least one active user profile/user device/user, the secured chain may be deleted by the service mesh.

Figure 1:
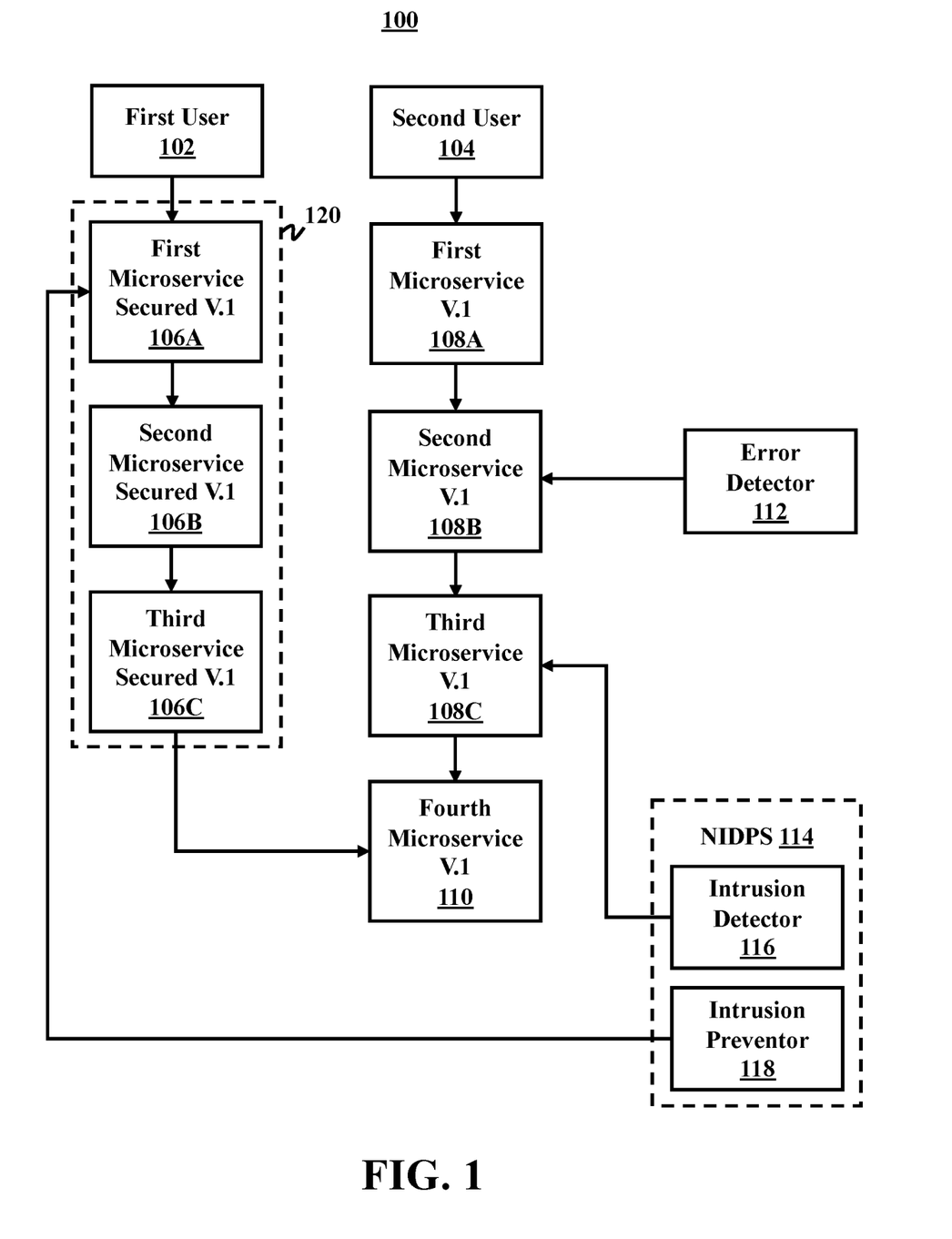
FIG. 1 illustrates a block diagram of an example intelligent routing system to address network intrusion within service mesh, in accordance with aspects of the present disclosure.

Referring now to FIG. 1, illustrated is a block diagram of an example intelligent routing system 100 to address network intrusion within service mesh, in accordance with aspects of the present disclosure. As depicted, the system 100 includes a first user 102 (e.g., an unauthorized user, a prohibited user, etc.), a second user 104 (e.g., an authorized user, an allowed user, etc.), microservices with first secured versions 106A-C, microservices with first versions 108A-C, a fourth microservice with a first version 110 (e.g., original microservice, original microservice chain, etc.), an error detector 112, and a network intrusion detection and prevention system (NIDPS) 114.

In some embodiments, the microservices with first secured versions 106A-C may be combined and/or placed in an automatically generated secured microservice chain 120, which may be a secured compartment for handling intrusions and/or DOSing. In some embodiments, the secured microservice chain 120 may be temporary. In some embodiments, the NIDPS 114 includes an intrusion detector 116 and an intrusion preventor 118.

In some embodiments, the intelligent routing system 100 is implemented in a service mesh-based architecture such as ISTIO, but it is not limited to it. In some embodiments, a service mesh control plane is extended, and it is able to detect all the microservice chains (e.g., 106A-C and/or 108A-C, etc.) that a particular user profile associated with the first user 102 and/or the second user 104 is participating. In some embodiments, the NIDPS 114 is integrated to the service mesh and then monitors all the proxy-to-proxy communications. In some embodiments, the NIDPS 114 may included standard network intrusion detection and prevention mechanisms, such as SNORT.

In some embodiments, the NIDPS 114, utilizing the intrusion detector 116, runs in a detection mode initially if there are no threats detected. As soon as single threat is detected by the intrusion detector 116 however, the user profile (associated with the first user 102) is extracted and the microservice chain (e.g., 106A-C) the first user 102 is on is also identified. With the identified microservice chain (e.g., 106A-C), all the microservices (e.g., 106A-C) which are participating are replicated by the intrusion preventor 118 to a specific compartment/namespace that is secured (e.g., the secured microservice chain 120). In such an embodiment, the chain (e.g., 106A-C) is replicated only from the microservice(s) which is intrusion detected. The newly deployed microservices are identified as a new secured version by the service mesh.

As an example, for what is depicted in FIG. 1, the microservices with first versions 108A-C and the fourth microservice with a first version 110 is a microservice chain. At the third microservice with a first version 108C, an intrusion event is detected by the intrusion detector 116 for the second user 104. Accordingly, the microservices with first versions 108A-C are replicated as the microservices with first secured versions 106A-C and placed in the secured microservice chain 120 (e.g., secured compartment), and the service mesh identifies the replicated microservices as the first secured versions.

The service mesh of the intelligent routing system 100 then automatically sets request routing rules for the second user 104 so that the traffic from the second user 104 now goes to the secured microservice chain 120, thus the intrusion of the first user 102 can be prevented. In some embodiments, similar monitoring by the error detector 112 is established for 40X errors in the logs for each user profile associated with the first user 102 and the second user 104. If a particular user profile is detected with 40X errors that are above an error threshold, the replication and intelligent routing could be implemented as discussed above.

In some embodiments, the service mesh of the intelligent routing system 100 continues to monitor the secured microservice chain 120. If there are no prohibited activities from the second user 104 for a period of time (e.g., 30 minutes, or any configurable time) then the secured microservice chain 120 is removed and the request routing rules also removed; the activity is then allowed to proceed to the fourth microservice with a first version 110 (or any original microservice chain). In some embodiments, the first user 102 and the second user 104 may be the same users. In some embodiments, the first user 102 is a prohibited user trying to monopolize microservice chains or interrupt services/activities for the second user 104 (e.g., the second user 104 is detected as having skeptical activity and after detection and prevention, it is identified that the first user 102 is the originator of the skeptical activity).

In some embodiments, a chain detector (not depicted) can be utilized to predictively identify microservices/microservice chains that a user/user profile is likely to be on/use. In such an embodiment, the chain detector could use historical information.

Figure 2:
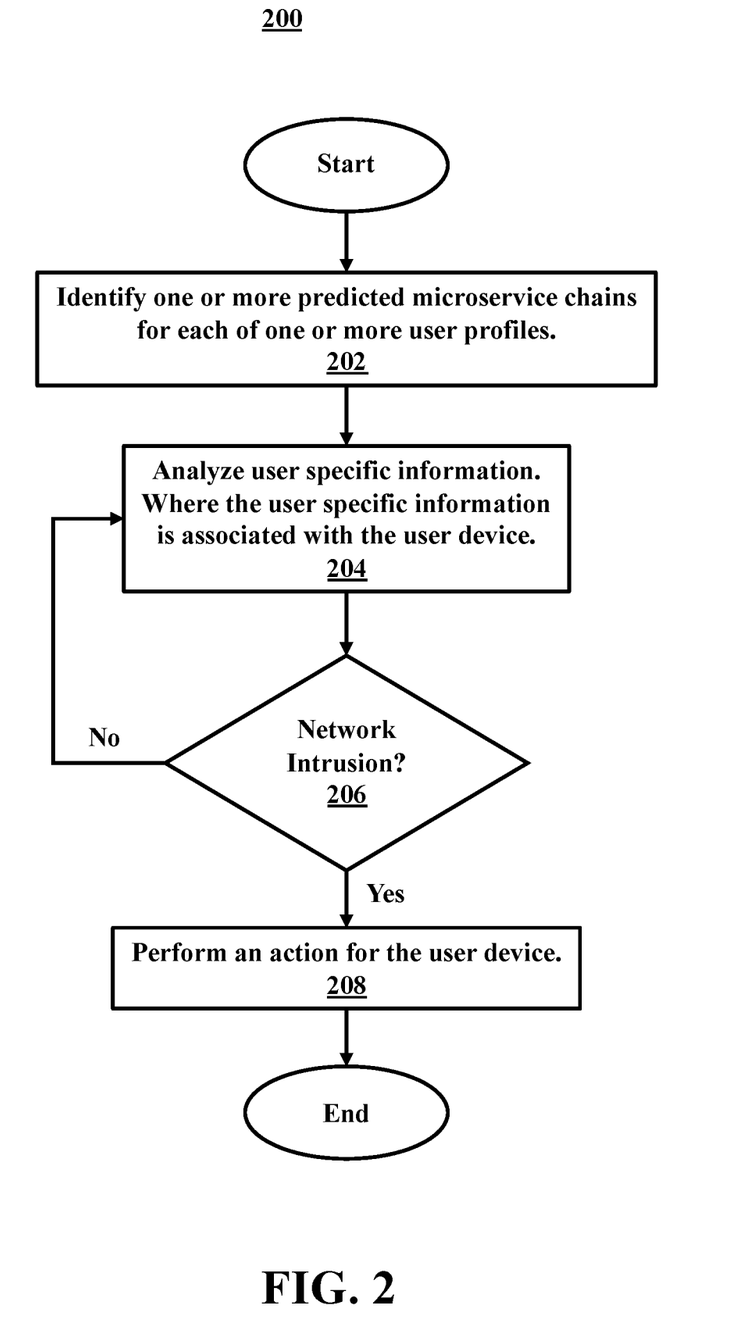
FIG. 2 illustrates a flowchart of an example method for intelligent request routing to address network intrusion within service mesh, in accordance with aspects of the present disclosure.

Referring now to FIG. 2, illustrated is a flowchart of an example method 200 for intelligent request routing to address network intrusion within service mesh, in accordance with aspects of the present disclosure. In some embodiments, the method 200 may be performed by a processor (e.g., of the intelligent routing system 100 of FIG. 1, etc.).

In some embodiments, the method 200 begins at operation 202 where the processor identifies one or more predicted microservice chains for each of one or more user profiles. The one or more predicted microservice chains may be selected based on historical information and the one or more user profiles may each be associated with a respective user of a user device.

In some embodiments, the method 200 proceeds to operation 204 where the processor analyzes user specific information. The user specific information may be associated with the user device. In some embodiments, the method 200 proceeds to decision block 206 where it is determined, based on the user specific information, if the user device causes network intrusion.

If, at decision block 206, it is determined that there is no network intrusion, the method 200 may proceed back to operation 204 and the processor may continue to analyze/monitor the user specific information for skeptical activity/network intrusion.

If, at decision block 206, it is determined that there is network intrusion, the method 200 may proceed to operation 208. At operation 208, the processor may perform an action for/on the user device. In some embodiments, the action may be placing activities/requests from the user device in a secured microservice chain, allowing activities/requests to go to an original microservice/microservice chain (e.g., perform normal functions, etc.), and/or updating request routing rules, etc.

In some embodiments, discussed below, there are one or more operations of the method 200 not depicted for the sake of brevity and which are discussed throughout this disclosure. Accordingly, in some embodiments, determining if the user device causes network intrusion may include the processor identifying that the user device does not cause network intrusion detection, and allowing requests from the user device to move to an original chain.

In some embodiments, determining if the user device causes network intrusion may include the processor identifying that the user device causes network intrusion detection. The processor may then generate, automatically, one or more temporary secured microservice chains. The processor may then route activities/requests from the user device to the one or more temporary secured microservice chains.

In some embodiments, the processor may analyze interactions/activities of the user device in the one or more temporary secured microservice chains. The processor may identify that the (activities of the) user device has not caused errors above an error threshold within a specific time period. The processor may generate, automatically, a routing request to an original microservice/microservice chain. The processor may route activities of the user device to the original microservice/microservice chain.

In some embodiments, identifying that the user device causes network intrusion includes the processor detecting that the user device has caused errors above an error threshold within a specific time period. In some embodiments, the one or more temporary secured microservice chains are a new version for each of the microservices participating in a network (e.g., routing of different versions of the same application based on user identity). In some embodiments, the processor may generate one or more request routing rules. The one or more request routing rules may ensure that activity of the user device is routed to the one or more temporary secured microservice chains.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
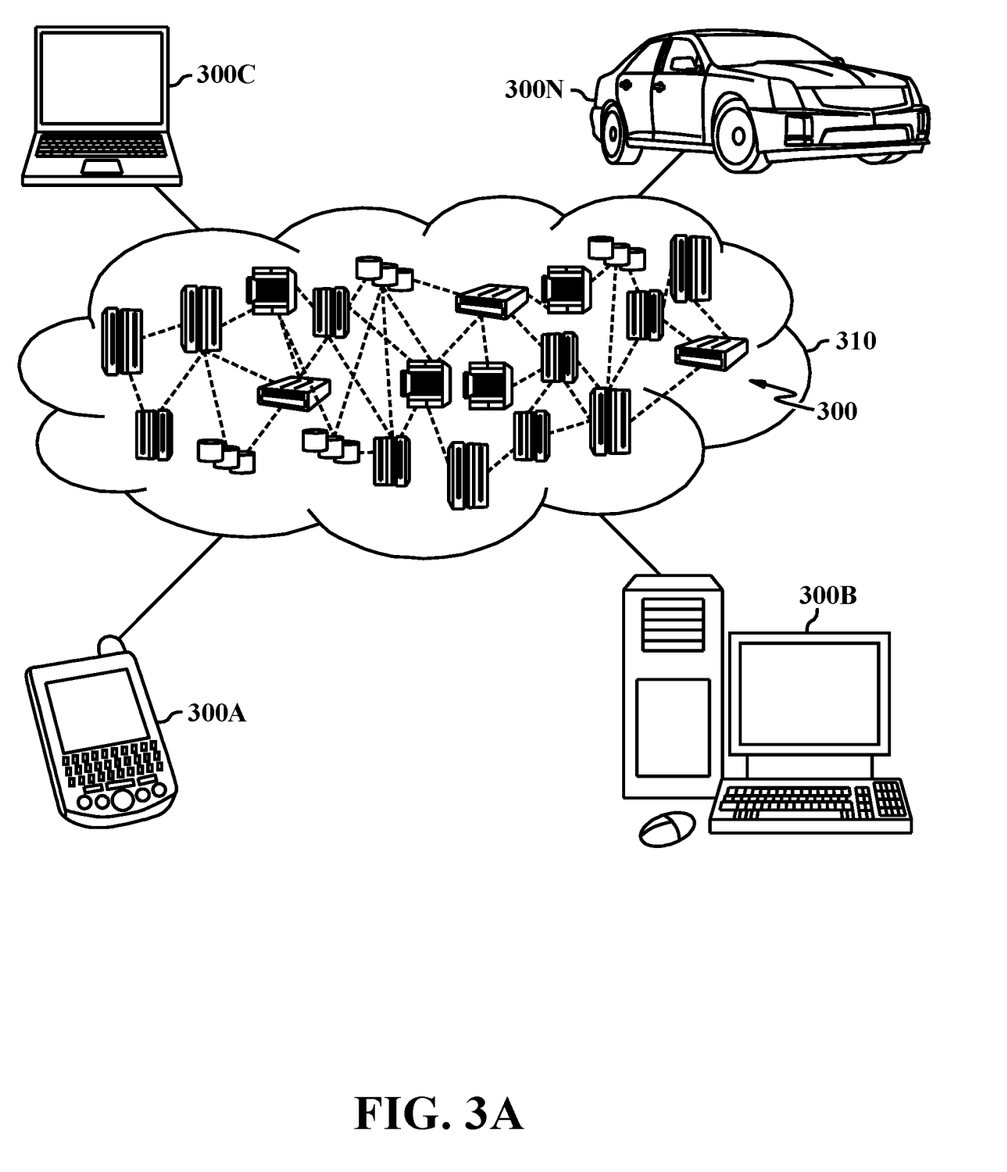
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
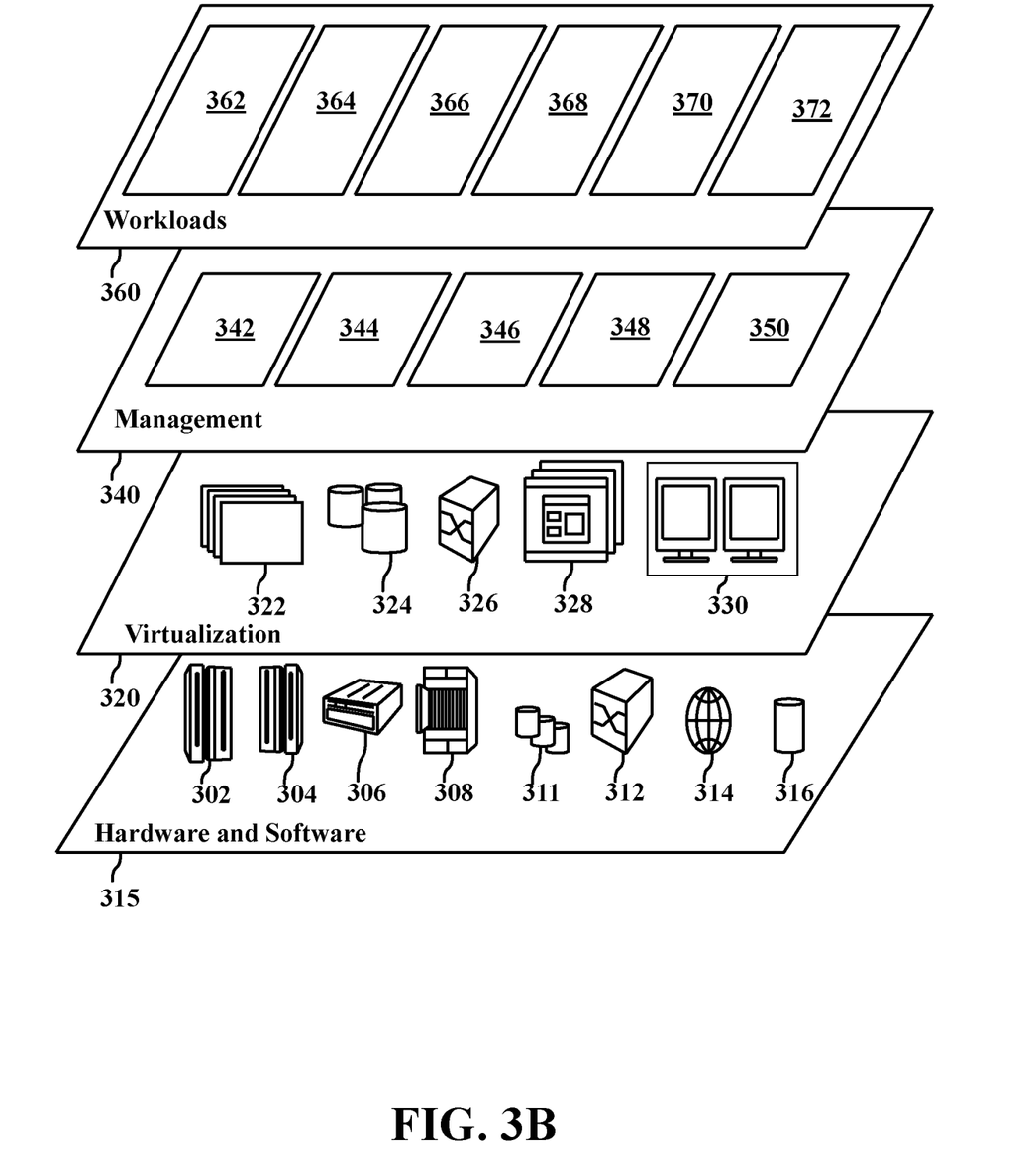
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and intelligent request routing 372.

Figure 4:
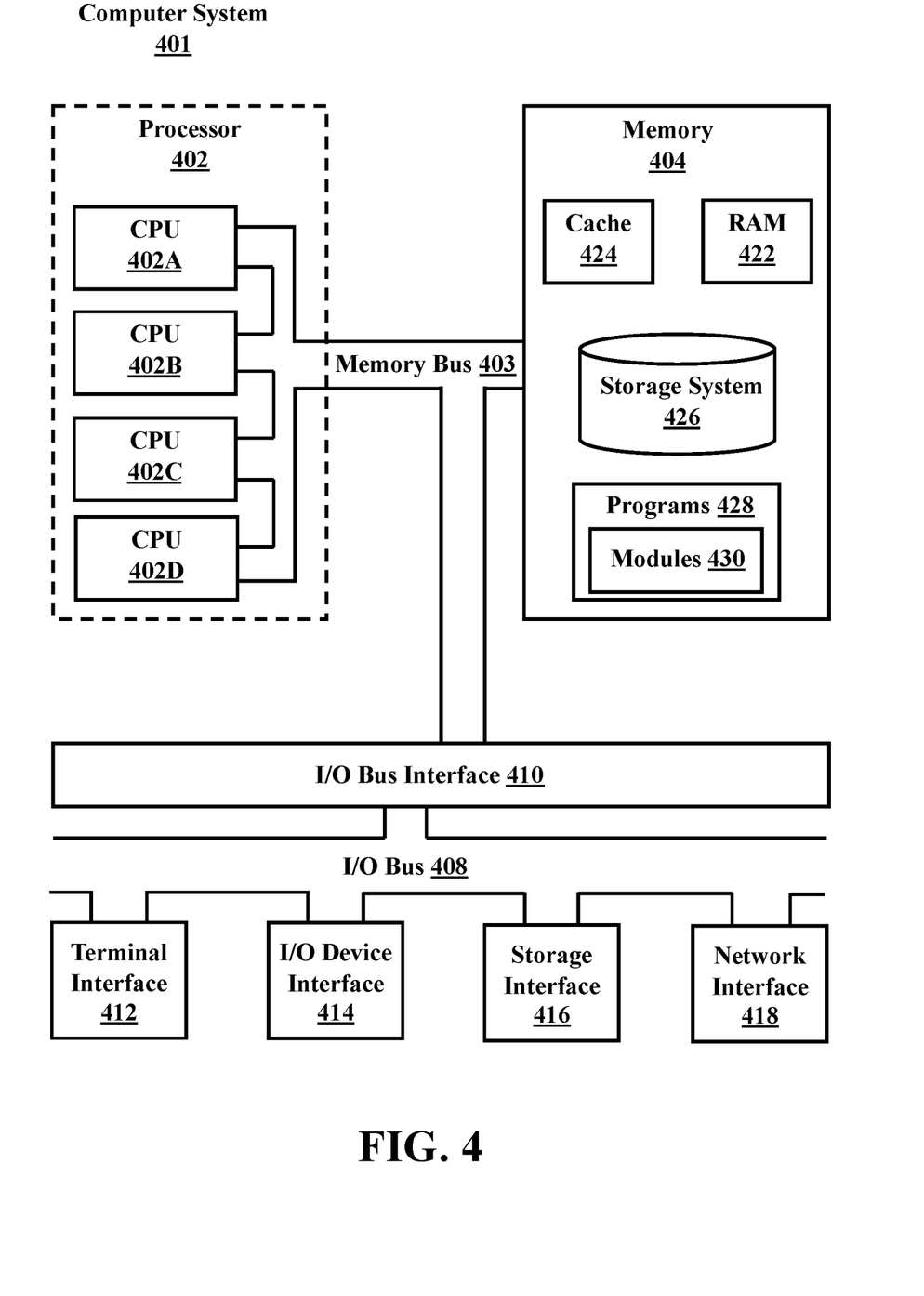
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for intelligent request routing to address network intrusion within service mesh, the system comprising:
   a memory; and
   a processor in communication with the memory, the processor being configured to perform operations comprising:
   identifying one or more predicted microservice chains for each of one or more user profiles, wherein the one or more predicted microservice chains are selected based on historical information, and wherein the one or more user profiles are each associated with a respective user of a user device;
   analyzing user specific information, wherein the user specific information is associated with the user device;
   determining, based on the user specific information, if the user device causes network intrusion;
   automatically generating, based on the user device causing network intrusion, one or more temporary secured microservice chains and routing requests from the user device to the one or more temporary secured microservice chains;
   determining if the user device has caused errors above an error threshold within a specific time period; and
   automatically applying, based on the user device causing errors above the error threshold, a rate limit to the user device.

2. The system of claim 1, wherein determining if the user device causes network intrusion comprises:
   identifying that the user device does not cause network intrusion detection; and
   allowing requests from the user device to move to an original chain.

3. The system of claim 1, wherein the processor is further configured to perform operations comprising:
   analyzing interactions of the user device in the one or more temporary secured microservice chains;
   identifying that the user device has not caused errors above an error threshold within a specific time period;
   generating, automatically, a routing request to an original microservice chain; and
   routing activities of the user device to the original microservice chain.

4. The system of claim 1, wherein the one or more temporary secured microservice chains are a new version for each of the microservices participating in a network.

5. The system of claim 4, wherein the processor is further configured to perform operations comprising:
   generating one or more request routing rules, wherein the one or more request routing rules ensure that activity from the user device is routed to the one or more temporary secured microservice chains.

6. A computer-implemented method for intelligent request routing to address network intrusion within service mesh, the method comprising:

identifying, by a processor, one or more predicted microservice chains for each of one or more user profiles, wherein the one or more predicted microservice chains are selected based on historical information, and wherein the one or more user profiles are each associated with a respective user of a user device;

analyzing user specific information, wherein the user specific information is associated with the user device;

determining, based on the user specific information, if the user device causes network intrusion;

automatically generating, based on the user device causing network intrusion, one or more temporary secured microservice chains and routing requests from the user device to the one or more temporary secured microservice chains;

determining if the user device has caused errors above an error threshold within a specific time period; and automatically applying, based on the user device causing errors above the error threshold, a rate limit to the user device.

7. The method of claim 6, wherein determining if the user device causes network intrusion comprises:

identifying that the user device does not cause network intrusion detection; and allowing requests from the user device to move to an original chain.

8. The method of claim 6, further comprising:

analyzing interactions of the user device in the one or more temporary secured microservice chains;

identifying that the user device has not caused errors above an error threshold within a specific time period;

generating, automatically, a routing request to an original microservice chain; and routing activities of the user device to the original microservice chain.

9. The method of claim 6, wherein the one or more temporary secured micro service chains are a new version for each of the microservices participating in a network.

10. The method of claim 9, further comprising:

generating one or more request routing rules, wherein the one or more request routing rules ensure that activity from the user device is routed to the one or more temporary secured microservice chains.

11. A computer program product for intelligent request routing to address network intrusion within service mesh comprising a computer readable storage medium having program instructions embodied therewith, the program instructions executable by a processor to cause the processor to perform operations, the operations comprising:

identifying one or more predicted microservice chains for each of one or more user profiles, wherein the one or more predicted microservice chains are selected based on historical information, and wherein the one or more user profiles are each associated with a respective user of a user device;

analyzing user specific information, wherein the user specific information is associated with the user device;

determining, based on the user specific information, if the user device causes network intrusion;

automatically generating, based on the user device causing network intrusion, one or more temporary secured microservice chains and routing requests from the user device to the one or more temporary secured microservice chains;

determining if the user device has caused errors above an error threshold within a specific time period; and automatically applying, based on the user device causing errors above the error threshold, a rate limit to the user device.

12. The computer program product of claim 11, wherein determining if the user device causes network intrusion comprises:

identifying that the user device does not cause network intrusion detection; and allowing requests from the user device to move to an original chain.

13. The computer program product of claim 11, wherein the processor is further configured to perform operations comprising:

analyzing interactions of the user device in the one or more temporary secured microservice chains;

identifying that the user device has not caused errors above an error threshold within a specific time period;

generating, automatically, a routing request to an original microservice chain; and routing activities of the user device to the original microservice chain.

14. The computer program product of claim 11, wherein the one or more temporary secured microservice chains are a new version for each of the microservices participating in a network, and wherein the processor is further configured to perform operations comprising:

generating one or more request routing rules, wherein the one or more request routing rules ensure that activity form the user device is routed to the one or more temporary secured microservice chains.

* * * * *